(12) United States Patent
Winger

(10) Patent No.: US 9,860,535 B2
(45) Date of Patent: Jan. 2, 2018

(54) METHOD FOR TIME-DEPENDENT VISUAL QUALITY ENCODING FOR BROADCAST SERVICES

(71) Applicant: Integrated Device Technology, Inc., San Jose, CA (US)

(72) Inventor: Lowell Leroy Winger, Waterloo (CA)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 114 days.

(21) Appl. No.: 14/717,931

(22) Filed: May 20, 2015

(65) Prior Publication Data

US 2016/0345027 A1 Nov. 24, 2016

(51) Int. Cl.
*H04N 19/179* (2014.01)
*H04N 19/162* (2014.01)
*H04N 19/156* (2014.01)
*H04N 19/115* (2014.01)

(52) U.S. Cl.
CPC ......... *H04N 19/115* (2014.11); *H04N 19/156* (2014.11); *H04N 19/162* (2014.11); *H04N 19/179* (2014.11)

(58) Field of Classification Search
None
See application file for complete search history.

(56) References Cited

U.S. PATENT DOCUMENTS

| | | | | |
|---|---|---|---|---|
| 8,990,408 B1* | 3/2015 | Owen | ................... | H04L 67/303 709/227 |
| 2010/0317420 A1* | 12/2010 | Hoffberg | ............ | G06Q 30/0207 463/1 |
| 2011/0243553 A1* | 10/2011 | Russell | .............. | G06Q 30/0631 398/25 |
| 2012/0151078 A1* | 6/2012 | Puthenpura | ......... | H04L 43/0882 709/231 |
| 2012/0185906 A1* | 7/2012 | Doets | ...................... | H04L 65/80 725/109 |
| 2014/0105273 A1* | 4/2014 | Chen | ..................... | H04N 19/188 375/240.02 |
| 2014/0280932 A1* | 9/2014 | Braun | ..................... | H04L 63/10 709/225 |
| 2015/0237356 A1* | 8/2015 | Wu | ........................ | H04N 19/70 375/240.03 |

* cited by examiner

*Primary Examiner* — Reza Aghevli
(74) *Attorney, Agent, or Firm* — Christopher P. Maiorana, PC

(57) ABSTRACT

Apparatuses and methods for adjusting an encoding profile to change the visual quality of broadcast video based, at least in part, on a time of day. An example apparatus may include an encoder configured to receive a video input and provide an encoded bitstream based at least in part on an encoding profile, wherein the encoder is further configured to determine the encoding profile based on a time of day. An example method may include encoding images based on a first profile during a first time period, changing to a second profile based on a second time period, and encoding images based on the second profile during the second time period.

19 Claims, 4 Drawing Sheets

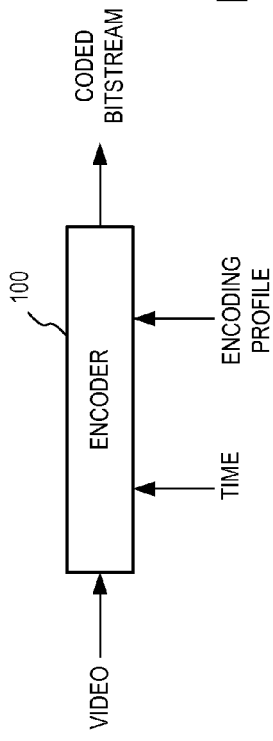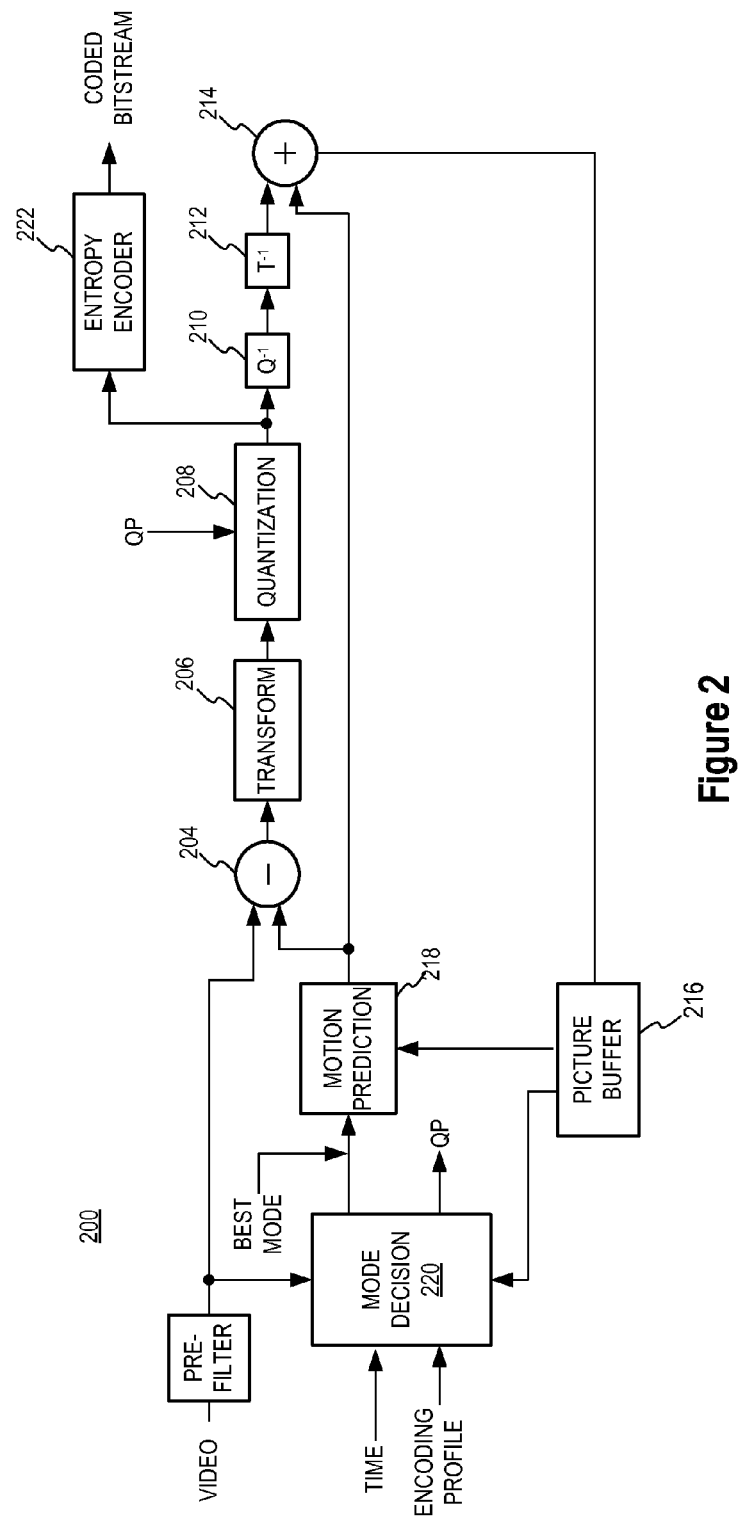

METHOD FOR TIME-DEPENDENT VISUAL QUALITY ENCODING FOR BROADCAST SERVICES

TECHNICAL FIELD

Embodiments of this invention relate generally to video encoding, and examples of systems and methods for adjustment of visual quality of encoding and encoding resources based on a time of day.

BACKGROUND

Video or other media content may be used by a variety of devices, including televisions, broadcast systems, mobile devices, and both laptop and desktop computers. Typically, devices may display video in response to receipt of video or other media content, often after decoding the signal from an encoded form. Video signals provided between devices are often encoded using one or more of a variety of encoding and/or compression techniques, and video signals are typically encoded in a manner to be decoded in accordance with a particular standard, such as MPEG-2, MPEG-4, and H.264/MPEG-4 Part 10. By encoding video or other media content, then decoding the received signals, the amount of data provided between devices may be significantly reduced.

The encoding may also affect the visual quality of the video and media signals. Conversely, a desired visual quality may determine how the encoding is implemented for various media content. For example, for linear broadcasting services, a high visual quality may be desired for specific content, which may affect the encoding process and what aspects of encoding are enabled/disabled. In such an instance, the encoding process may use all available aspects to ensure the desired high visual quality is provided. In other settings, such as streaming services, the desired visual quality may be reduced, which may affect the aspects of the encoder used to encode the streaming content. In general, however, the value of the media content being delivered may determine the encoding process used to provide an associated visual quality.

BRIEF DESCRIPTION OF THE DRAWINGS

FIG. 1 is a block diagram of an encoder according to an embodiment of the present invention.

FIG. 2 is a block diagram of an encoder according to an embodiment of the present invention.

DETAILED DESCRIPTION

Figure 3:
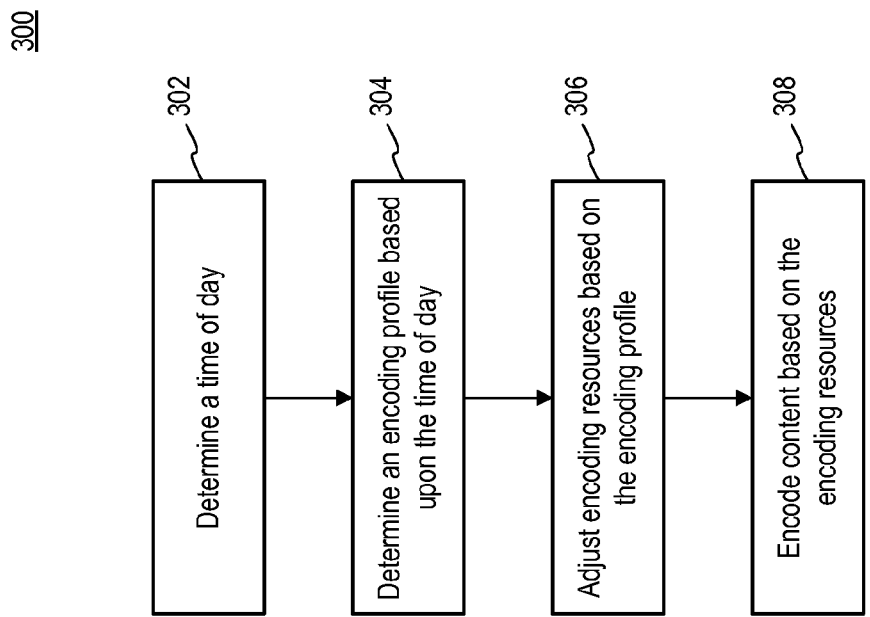
FIG. 3 is a flowchart of a method for providing an activity-variance ratio of a macroblock according to an embodiment of the present invention.

Examples of apparatuses and methods for adjusting an encoding profile to change the visual quality are described herein. In accordance with one or more described embodiments, an encoding profile may be adjusted based on a time of day. The value of media content associated various times of day may be the basis for adjusting the encoding profile, which may affect an amount of encoding resources enabled for a specific time of day. Certain details are set forth below to provide a sufficient understanding of embodiments of the invention. However, it will be clear to one having skill in the art that embodiments of the invention may be practiced without these particular details, or with additional or different details. Moreover, the particular embodiments of the present invention described herein are provided by way of example and should not be used to limit the scope of the invention to these particular embodiments. In other instances, well-known video components, encoder or decoder components, circuits, control signals, timing protocols, and software operations have not been shown in detail in order to avoid unnecessarily obscuring the invention.

FIG. 1 is a block diagram of an apparatus in the form of an encoder 100 according to an embodiment of the invention. The encoder 100 may include one or more logic circuits, control logic, logic gates, processors, memory, and/or any combination or sub-combination of the same, and may be configured to encode and/or compress a video signal using one or more encoding techniques, examples of which will be described further below. The encoder 100 may be configured to encode, for example, a variable bit rate signal and/or a constant bit rate signal, and generally may operate at a fixed rate to output a bitstream that may be generated in a rate-independent manner. The encoder 100 may be implemented in any of a variety of devices employing video encoding, including, but not limited to, televisions, broadcast systems, mobile devices, and both laptop and desktop computers.

The encoder 100 may be implemented in hardware such as by one or more application specific integrated circuit (ASICs) or as one or more algorithms operating on dedicated processors, which may be general processors or floating-point operating processors specifically designed for complex calculations. Alternatively, the encoder 100 may be implemented as one or more virtual machines in a cloud computing system. By implementing the encoder 100 as one or more virtual machines in a cloud computing system, the number of virtual machines may be changed, e.g., increased and decreased, based on various aspects or desired qualities of the encoder 100.

In at least one embodiment, the encoder 100 may include an entropy encoder, such as a variable-length coding encoder (e.g., Huffman encoder or CAVLC encoder), and/or may be configured to encode data, for instance, at a macroblock level. Each macroblock may be encoded in intra-coded mode, inter-coded mode, bidirectionally, or in any combination or subcombination thereof. The encoder 100 may also include various other functional blocks that may be enabled/disabled to include or remove their respective functionality from the encoder 100. The various functional blocks may also be implemented in hardware or software. For example, a pre-filter block may be enabled so to filter noise from the video prior to encoding, which may improve the visual quality of the coded bitstream.

By way of example, the encoder 100 may receive and encode a video signal that includes a plurality of sequentially ordered coding units (e.g., block, macroblock, slice, frame, field, group of pictures, sequence). The video signal may be encoded in accordance with one or more encoding standards, such as MPEG-2, MPEG-4, H.263, H.264, H.265, and/or HEVC, to provide a coded bitstream. The coded bitstream may in turn be provided to a data bus and/or to a device, such as a decoder or transcoder (not shown in FIG. 1). A video signal may include a transient signal, stored data, or both.

Visual quality of the coded bitstream may be determined by an encoding profile, for example. The encoding profile may determine various encoding process to enable/disable, enhance, and/or duplicate/reduce to affect the visual quality. For example, the encoding profile may include data indicating to an encoder a particular level of visual quality to achieve, which may affect the computational resources necessary to perform the encoding. The various encoding processes may also affect a quantity of encoding resources (e.g. processors, circuitry, and/or other computational resources) used for encoding the coded bitstream. Changing the quantity of encoding resources may affect power consumption and the cost of the encoding. For example, if a high visual quality is desired, such as by a media content provider, encoding processes such as pre-filtering may be enabled, and multiple encoding passes may be performed. These added processes and passes, however, may increase the quantity of encoding resources used to encode the video due to the added pre-filter and the added encoding passes, which require additional hardware and/or software resources. Various other encoding factors may also be altered to change the visual quality, these factors may include but are not limited to quantization parameter, the number of bits used for encoding the bitstream, and the encoding mode, to give a few examples. Other encoding factors that may affect the visual quality may be to encode with a constant quantization parameter and by using different amounts of motion estimation in determining a residual. Encoding profiles may include data indicative of settings for any or all of these factors, and/or values for any or all of the factors.

The encoding profile of the encoder 100 may be periodically changed to alter the visual quality of the media provided in the coded bitstream. Various encoding profiles available for the encoder 100 may be stored in a look up file within the encoder 100, or they may be provided from external as depicted in FIG. 1. Each of the various profiles may be associated with a time period of day, for example, and the encoder 100 may monitor the time and adjust the encoding profile as the time enters a different time period. For example, it may be desirable to provide the highest visual quality during certain periods of the day, such as primetime television hours, which may result in the profile of the encoder 100 being changed so that a maximum visual quality is provided. Conversely, other time periods of the day may be associated with lesser visual quality, at which time the encoder 100 may reduce the visual quality based on an associated encoding profile. By changing the profile of the encoder 100, a quantity of encoding resources may be altered so that resource consumption is increased or decreased in accordance with a target visual quality. The change in encoding resources may not only affect the visual quality of the bitstream but also the costs associated with the encoding, e.g., power consumption, computer usage, etc. In the above example, the number of encoding resources consumed by the encoder 100 may be increased to ensure the maximum visual quality may be provided, which, for example, may increase a number of processor cores of the encoder 100 used in encoding the video input.

To encode a video signal, the encoder may utilize the encoding profile, as one technique, to determine the level of visual quality to provide in the encoded bitstream. The profile may be identified in accordance with any suitable encoding methodologies, including those directed to visual quality manipulation of the bitstream. The encoder 100 may adjust the encoding profile based, at least in part, on time of day, value of the content provided to the encoder, user specified conditions, or combinations thereof. A user here may be a media content provider, which may set profiles for various types of media provided and/or generated. For example, the encoder 100 may be configured to provide a high visual quality based, at least in part, on the content being provided during a prime viewing period of the day. Adjusting the visual quality throughout a day in this manner may improve resource usage of the encoder 100. For example, during the late-night hours of a day when the visual quality of the delivered content is not required to be at a maximum, the profile of the encoder 100 may be adjusted to use fewer encoding resources, which may reduce power consumption and cost associated with the encoding.

FIG. 2 is a block diagram of an encoder 200 according to an embodiment of the present invention. The encoder 200 may be used to implement, at least in part, the encoder 100 of FIG. 1, and may further be compliant with one or more known coding standards, such as MPEG-2, H.264, and H.265 coding standards.

The encoder 200 may include a pre-filter 202, a mode decision block 220, a motion prediction block 218, a subtractor 204, a transform 206, a quantization block 208, an entropy encoder 222, an inverse quantization block 210, an inverse transform block 212, an adder 214, and a picture filter 216. Each of these various blocks may be implemented separately in hardware, software, or combinations thereof. Further, each of the blocks may be independent or combined in various combinations within the encoder 200. Implementing the encoder in combinations of hardware and software may provide flexibility to the encoder 200 to enable and disable various blocks to alter the performance of the encoder 200. Enabling and disabling the various blocks independently may allow the quantity of resources used to encode a video stream to be altered.

The encoder 200 may encode video or media content and provide a coded bitstream at a desired visual quality. An encoding profile of the encoder 200 may be changed to adjust the visual quality the coded bitstream may provide to an end viewer. Different profiles may be associated with media content of different values so that media content of higher value may be associated with an encoding profile designed to provide a higher visual quality. Conversely, media content of lesser value may be associated with an encoding profile designed to provide reduced visual quality. The encoder 200 may determine a value of the media content being encoding based on a time of day or a time period of day. As such, the encoder 200 may monitor a time of day and adjust encoding profile settings based thereon. Adjusting encoding profiles throughout a day may allow the encoder 200 to adjust resource and power consumption since a desired visual quality may determine an amount of resources used.

The mode decision block 220 may receive an incoming video signal (e.g. a transient signal or stored data from a memory) and may determine an appropriate coding mode for the video signal based on properties of the video signal and a decoded picture buffer signal. Further, in some embodiments, the mode decision block may receive a time input and an encoding profile input, which may be used to adjust aspects of the encoding process. The incoming video signal may be preprocessed by the pre-filter 202, which may be enabled and disabled by the encoder 200 based on the encoding profile. The mode decision 220 block may determine an appropriate coding mode on a per frame and/or macroblock basis. The mode decision may include macroblock type, intra modes, inter modes, syntax elements (e.g., motion vectors), and/or one or more quantization parameters.

The output of the mode decision block 220 may be utilized by the motion prediction block 218 to generate a predictor in accordance with one or more coding standards and/or other prediction methodologies, which may be encoding profile dependent. The predictor may be subtracted from the video signal by the subtractor 204. The output of the subtractor 204 may be a residual, e.g. the difference between a block and a prediction for a block. Further, the motion prediction block 218 may adjust amounts of motion estimation, search ranges, and/or a number of reference frames used in the motion estimation process based on the encoding profile. The motion estimation block, based on the profile, may be adjusted to use more or less resources, where increasing the amount of motion estimation, the search range, and the number of reference fames may increase resource consumption.

The transform 206 may perform a transform, such as a discrete cosine transform (DCT), on the residual to transform the residual to the frequency domain. As a result, an output of the transform 206 may be a block of coefficients that may, for instance, correspond to spectral components of data in the video signal. For example, the coefficient block may include a DC coefficient corresponding to a zero frequency component of the video signal. The DC coefficient may, for instance, represent an average value of the coefficient block. The coefficient block may further include one or more AC coefficients corresponding to higher (non-zero) frequency portions of the video signal.

The quantization block 208 may receive the block of coefficients and quantize the coefficients (e.g., DC coefficient and AC coefficients) to produce a quantized coefficient block. The quantization provided by the quantization block 208 may be lossy and/or may also utilize one or more quantization parameters to employ a particular degree of quantization for one or more coefficients of the coefficient block. A quantization parameter may correspond with an amount of spatial detail preserved during a respective quantization process. QP may be received from the mode decision block 220, but it will be appreciated that in some instances, QP may be specified by a user, or may be provided by another element of the encoder 200. The quantization parameter QP may be adjusted for each macroblock, and/or may be based on the encoding profile. The QP may also affect the number of resources consumed in the encoding process. For example, a lower QP may provide higher visual quality, but may require an increased amount of encoding resources when quantizing the coefficients. A higher QP may have the opposite effect.

In turn, the entropy encoder 222 may encode the quantized coefficient block to provide a coded bitstream. The entropy encoder 222 may be any entropy encoder known by those having ordinary skill in the art or hereafter developed, such as a variable length coding (VLC) encoder or a context-adaptive binary arithmetic coding (CABAC) encoder. The quantized coefficient block may also be inverse-quantized by the inverse quantization block 210. The inverse-quantized coefficients may be inverse transformed by the inverse transform block 212 to produce a reconstructed residual, which may be added to the predictor at the adder 214 to produce reconstructed video. The reconstructed video may be provided to the picture buffer 216 for use in future frames, and further may be provided from the picture buffer 216 to the mode decision block 220 and the motion prediction block 218 for further in-macroblock intra prediction or other mode decision methodologies.

In an example operation of the encoder 200, a video signal (e.g. a base band video signal) may be provided to the encoder 200 and encoded based on a profile, which may be determined based on the time of day. The video signal may be provided to the delay buffer 202 and the mode decision block 230. The mode decision block 230 may receive an encoding profile and a time, for instance, from an external device, and may provide a quantization parameter QP to the quantization block 208 based partially on an encoding profile. Further, based on the encoding profile, the mode decision block 220 may adjust the amount of motion estimation used by the motion prediction block 218. The subtractor 204 may receive the video signal from the pre-filter 202 and may subtract a motion prediction signal from the video signal to generate a residual signal. The residual signal may be provided to the transform 206 and processed using a forward transform, such as a DCT. As described, the transform 206 may generate a coefficient block that may be provided to the quantization block 208, and the quantization block 208 may quantize and/or optimize the coefficient block. Quantization of the coefficient block may be based on the quantization parameter QP, and quantized coefficients may be provided to the entropy encoder 222 and thereby encoded into a coded bitstream.

The quantized coefficient block may further be provided to the feedback loop of the encoder 200. That is, the quantized coefficient block may be inverse quantized and inverse transformed by the inverse quantization block 210 and the inverse transform 212, respectively, to produce a reconstructed residual. The reconstructed residual may be added to the predictor at the adder 214 to produce reconstructed video, which may be written to the decoded picture buffer 216 for use in future frames, and fed back to the mode decision block 220 and the motion prediction block 218. Based, at least in part, on the reconstructed video signals and the encoding profile, the motion prediction block 218 may provide a motion prediction signal to the adder 204.

Accordingly, the encoder 200 of FIG. 2 may provide a coded bitstream based on a video signal, where the coded bitstream is generated in part based on an encoding profile in accordance with embodiments of the present invention. Additionally, the encoder 200 may periodically change the encoding profile based on the time and/or a value of the video signal being encoded. For example, the encoder 200 may include a look up table that associates different encoding profiles with different times or time periods of the day. As the time changes, the encoder 200 may determine if the encoding profile may need to be changed. Once a different time period of day has been entered, the encoder 200 may determine the characteristics of the associated encoding profile and make changes accordingly. For example, the pre-filter 202 may be disable/enabled, the number of encoding passes the video signal experiences may be increased/decreased, the QP level adjusted, the motion predictor functionality altered, or combinations thereof. By changing the encoding profile, a quantity of encoding resources may be adjusted by altering complete classes of functionality of the encoder 200. The examples of encoding functionality listed are for illustrative purposes only and one skilled in the art would understand various other techniques to effect the same changes, which are contemplated herein.

The encoder 200 may be operated in semiconductor technology, and may be implemented in hardware, software, or combinations thereof. In some examples, the encoder 200 may be implemented in hardware with the exception of the mode decision block 230 that may be implemented in software. In other examples, other blocks may also be implemented in software, however software implementations in some cases may not achieve real-time operation.

FIG. 3 is a flowchart of a method 300 for selectively adjusting visual quality of an encoder based on a time of day-dependent encoding profile according to an embodiment of the present invention. The method 300 may be implemented by the encoder 200 of FIG. 2 and/or the encoder 100 of FIG. 1, for example. At step 302, an encoder may determine a time of day. The time of day may be received from an external source, or an internal clock of the encoder may be used to determine the time of day. However, any time keeping/determination method known by those of skill in the art would suffice. The time of day may be used to determine if an encoding profile of the encoder may be changed.

At step 304, the encoder may determine an encoding profile based on the time of day. If, based on the time of day, the current encoding profile is still the desired encoding profile, then the encoder may end the method 300. However, of the encoder determines that the time of day is associated with a different encoding profile, then the encoder may proceed to step 306. Alternatively, the encoder may monitor the time of day and upon determining that a different designated time period has been entered, the encoder may determine an encoding profile associated with the recently entered time period. Either way, the encoder may consult a look up table included in the encoder to determine an encoding profile associated with a time or time period of the day. Each of the encoding profiles in the look up table, for example, may be configured to provide a different visual quality.

At step 306, the encoder may adjust the encoding resources based on a new/different encoding profile. For example, if a new encoding profile is to provide higher visual quality than the previous encoding profile, then the encoder may enable pre-filtering, increase a number of encoding passes performed, filter out ringing artifacts, decrease the quantization parameter, and/or increase the search range of a motion predictor. A combination or all of the various changes may enhance the visual quality and increase a quantity of encoding resources used to encode. At step 308, the encoder may encode the data based on the encoding profile and the encoding resources associated with the encoding profile.

One or more of the methods described herein and/or any pseudocode described herein, may be implemented as computer executable instructions stored on computer readable media and/or executed on one or more processors or processor cores. Computer readable media may include any form of computer readable storage or computer readable memory, transitory or non-transitory, including but not limited to externally or internally attached hard disk drives, solid-state storage (such as NAND flash or NOR flash media), tiered storage solutions, storage area networks, network attached storage, and/or optical storage.

Figure 4:
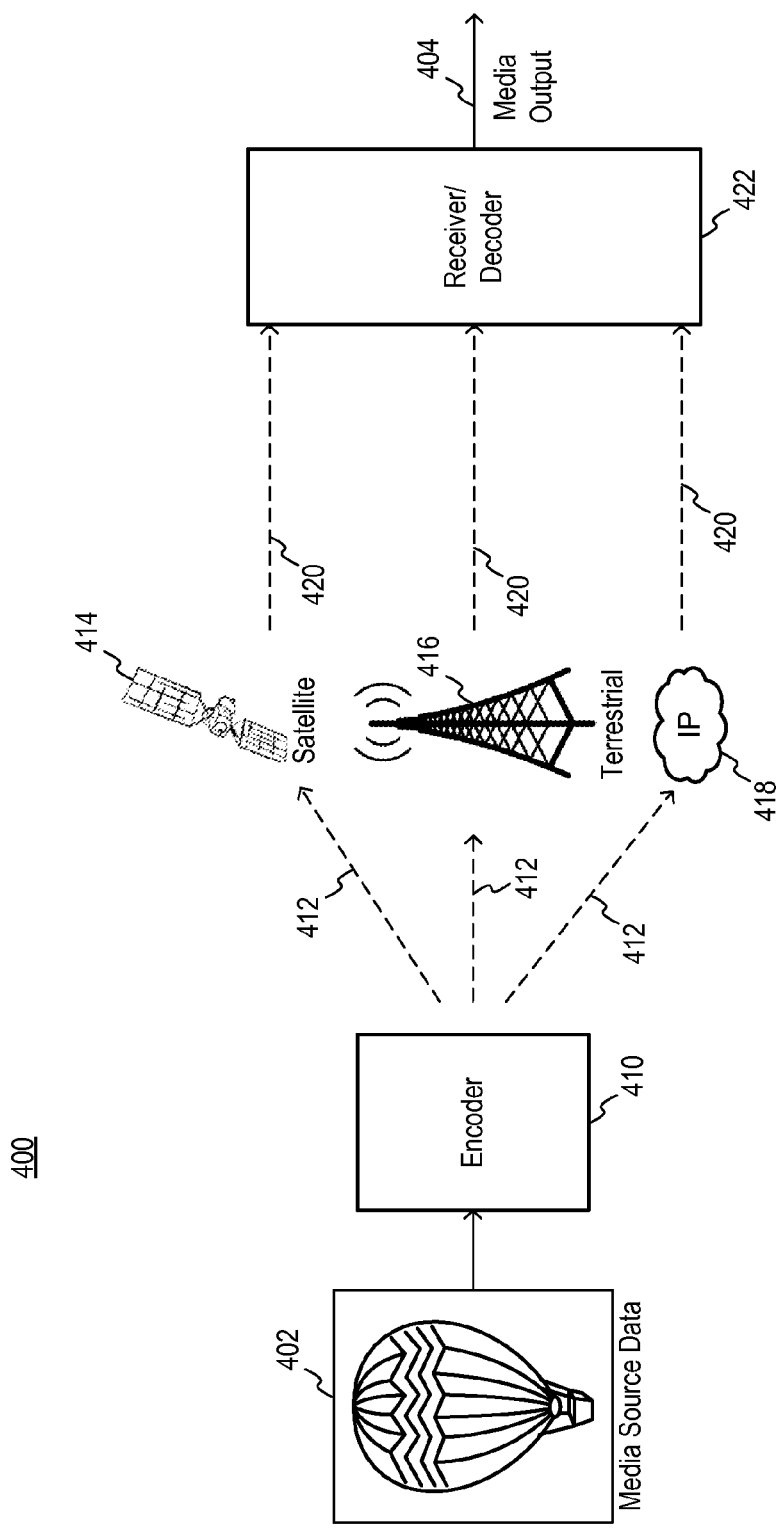
FIG. 4 is a schematic illustration of a media delivery system according to an embodiment of the invention.

FIG. 4 is a schematic illustration of a media delivery system 400 in accordance with embodiments of the present invention. The media delivery system 400 may provide a mechanism for delivering a media source 402 to one or more of a variety of media output(s) 404. Although only one media source 402 and media output 404 are illustrated in FIG. 4, it is to be understood that any number may be used, and examples of the present invention may be used to broadcast and/or otherwise deliver media content to any number of media outputs.

The media source data 402 may be any source of media content, including but not limited to, video, audio, data, or combinations thereof. The media source data 402 may be, for example, audio and/or video data that may be captured using a camera, microphone, and/or other capturing devices, or may be generated or provided by a processing device. Media source data 402 may be analog or digital. When the media source data 402 is analog data, the media source data 402 may be converted to digital data using, for example, an analog-to-digital converter (ADC). Conventionally, to transmit the media source data 402, some type of compression and/or encryption may be desirable. Accordingly, an encoder 410 may be provided that may encode the media source data 402 using any encoding method in the art, known now or in the future, including encoding methods in accordance with video standards such as, but not limited to, MPEG-2, MPEG-4, H.264, H.HEVC, or combinations of these or other encoding standards. The encoder 410 may be implemented using any encoder described herein, including the encoder 100 of FIG. 1 and the encoder 200 of FIG. 2.

The encoder 410 may be configured to change the visual quality of the encoded data 412 based on a time period of the day and an associated encoding profile. The encoder 410 may monitor the time throughout the day and adjust the encoding profile when a different time of day is entered, or the encoder 410 may be externally directed to change the encoding profile. A look up table may be included in the encoder 410 that includes time periods and their associated encoding profiles. The encoder 410, based on the time of day, may determine an associated encoding profile and adjust the encoding of the encoded data 412 based thereon.

The encoded data 412 may be provided to a communications link, such as a satellite 414, an antenna 416, and/or a network 418. The network 418 may be wired or wireless, and further may communicate using electrical and/or optical transmission. The antenna 416 may be a terrestrial antenna, and may, for example, receive and transmit conventional AM and FM signals, satellite signals, or other signals known in the art. The communications link may broadcast the encoded data 412, and in some examples may alter the encoded data 412 and broadcast the altered encoded data 412 (e.g. by re-encoding, adding to, or subtracting from the encoded data 412). The encoded data 420 provided from the communications link may be received by a receiver 422 that may include or be coupled to a decoder. The decoder may decode the encoded data 420 to provide one or more media outputs, with the media output 404 shown in FIG. 4.

The receiver 422 may be included in or in communication with any number of devices, including but not limited to a modem, router, server, set-top box, laptop, desktop, computer, tablet, mobile phone, etc.

The media delivery system 400 of FIG. 4 and/or the encoder 410 may be utilized in a variety of segments of a content distribution industry. The encoder 410 may adjust encoding resources consumption based on time of day. The encoding resources may be adjusted by changing an encoding profile of the encoder 410, where the profile affects visual quality of the encoded data 412, for example. Alternatively or additionally, if the communication link alters the encoded data 412, then the visual quality of the encoded data 420 may further be adjusted based on time of day and an encoding profile. For example, the encoder 410 may reduce the resources, e.g., calculating resources such as a number of processor cores used to perform the encoding, used to encode the data 602. The reduction of resources may provide encoded data 612 at a lower visual quality. In other instances, the time of day may cause the encoder 410 to increase the number of resources used to encode the data 402 so that the visual quality of the encoded data 412 is enhanced.

Figure 5:
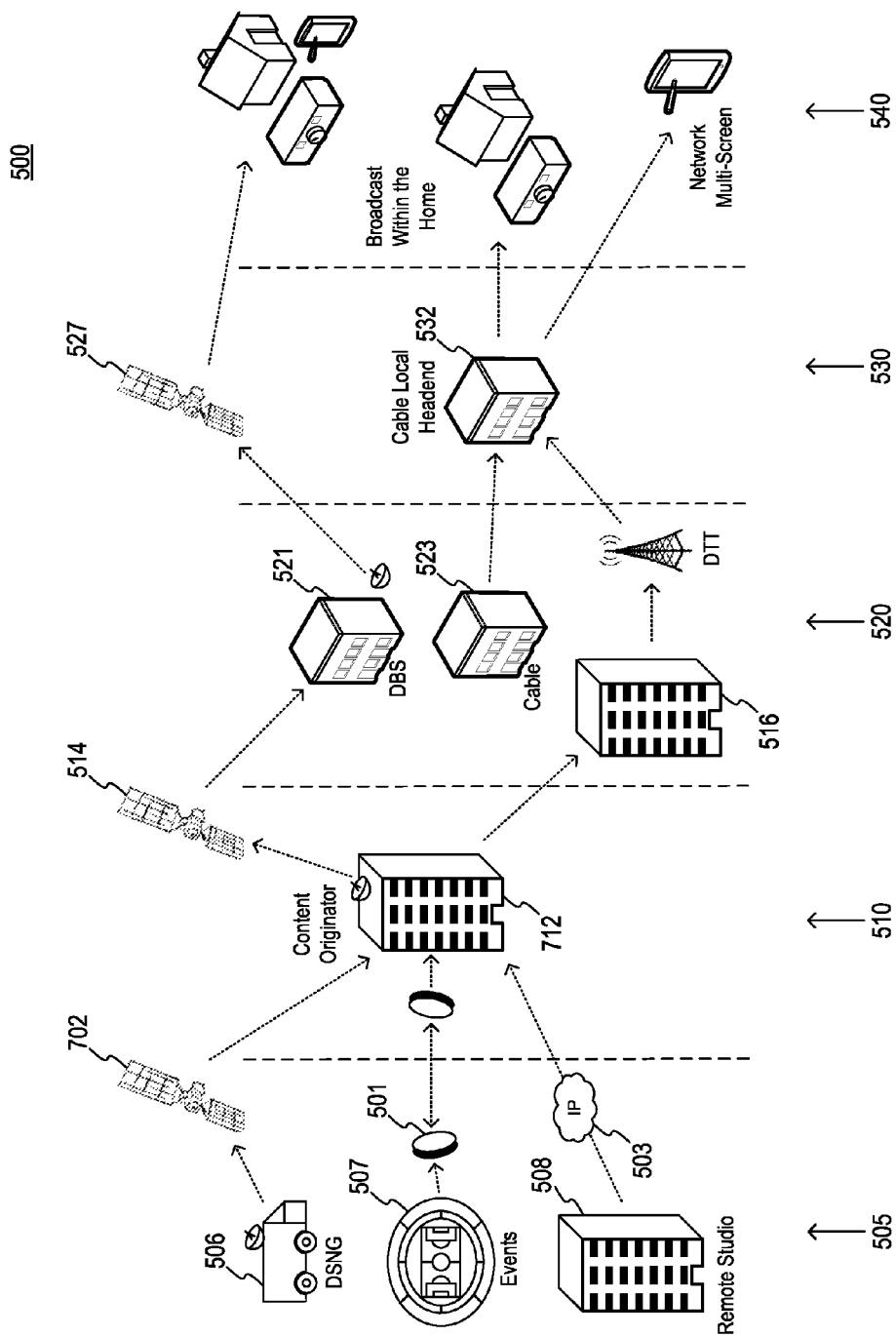
FIG. 5 is a schematic illustration of a video distribution system that may make use of encoders described herein.

FIG. 5 is a schematic illustration of a video distribution system 500 that may make use of encoders described herein. The video distribution system 500 includes video contributors 505. The video contributors 505 may include, but are not limited to, digital satellite news gathering systems 506, event broadcasts 507, and remote studios 508. Each or any of these video contributors 505 may utilize an encoder described herein, such as the encoder 410 of FIG. 4, to encode media source data and provide encoded data to a communications link. The digital satellite news gathering system 506 may provide encoded data to a satellite 502. The event broadcast 507 may provide encoded data to an antenna 501. The remote studio 508 may provide encoded data over a network 503.

A production segment 510 may include a content originator 512. The content originator 512 may receive encoded data from any, all, or combinations of the video contributors 505. The content originator 512 may make the received content available, and may edit, combine, and/or manipulate any of the received content to make the content available. The content originator 512 may utilize encoders described herein, such as the encoder 510 of FIG. 5, to provide encoded data to the satellite 514 (or another communications link). The content originator 512 may provide encoded data to a digital terrestrial television system 516 over a network or other communication link. In some examples, the content originator 512 may utilize a decoder to decode the content received from the contributor(s) 505. The content originator 512 may then re-encode data and provide the encoded data to the satellite 514. In other examples, the content originator 512 may not decode the received data, and may utilize a transcoder to change an encoding format of the received data.

A primary distribution segment 520 may include a digital broadcast system 521, the digital terrestrial television system 516, and/or a cable system 523. The digital broadcasting system 521 may include a receiver, such as the receiver 422 described with reference to FIG. 4, to receive encoded data from the satellite 514. The digital terrestrial television system 516 may include a receiver, such as the receiver 422 described with reference to FIG. 4, to receive encoded data from the content originator 512. The cable system 523 may host its own content which may or may not have been received from the production segment 510 and/or the contributor segment 505. For example, the cable system 523 may provide its own media source data 402 as that which was described with reference to FIG. 4.

The digital broadcast system 521 may include an encoder, such as the encoder 410 of FIG. 4, to provide encoded data to the satellite 525. The cable system 523 may include an encoder, such as the encoder 410 of FIG. 4, to provide encoded data over a network or other communications link to a cable local headend 532. A secondary distribution segment 530 may include, for example, the satellite 525 and/or the cable local headend 532.

The digital broadcast system 521, the cable system 523, and the digital terrestrial television system 516 may adjust the visual quality of the encoded data they provide based on a value of the content, which may be determined from the time of day. By adjusting the visual quality throughout the day, the quantity of encoding resources may be adjusted, which may affect costs associated with the encoding process.

The systems of the primary distribution segment 520, which all may include an encoder, such as the encoder 100 of FIG. 1 or the encoder 200 of FIG. 2, may adjust encoding resource consumption based on a time of day. As visual quality requirements, fluctuate throughout a day of media programming, the encoding resources consumed by the various systems of the primary distribution segment 520 may adjust the encoding resources used for encoding the media programming. Adjustment of encoding resources may reduce power consumption and costs for the various systems of the primary distribution segment 520, for example.

The cable local headend 532 may include an encoder, such as the encoder 410 of FIG. 4, to provide encoded data to clients in a client segment 540 over a network or other communications link. The satellite 525 may broadcast signals to clients in the client segment 540. The client segment 540 may include any number of devices that may include receivers, such as the receiver 422 and associated decoder described with reference to FIG. 4, for decoding content, and ultimately, making content available to users. The client segment 540 may include devices such as set-top boxes, tablets, computers, servers, laptops, desktops, cell phones, etc.

Accordingly, encoding, transcoding, and/or decoding may be utilized at any of a number of points in a video distribution system. Embodiments of the present invention may find use within any, or in some examples all, of these segments.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method, comprising:
    enabling a pre-filtering of images before encoding the images based on a first profile;
    encoding the images based on the first profile during a first time period;
    changing to a second profile associated with a second time period;
    disabling the pre-filtering of the images before encoding the images based on the second profile; and
    encoding the images based on the second profile during the second time period, wherein (i) each profile determines one or more resources configured to be applied to the images before generating an encoded bitstream and (ii) the first profile provides higher visual quality of the encoded images than the second profile.

2. The method of claim 1, further comprising:
    determining a time change from the first time period to the second time period; and
    determining the second profile.

3. The method of claim 2, wherein determining the second profile associated with the second time period comprises:
    accessing a lookup table that includes a plurality of profiles with each profile associated with a different time period; and
    determining the second profile associated with the second time period from the lookup table.

4. The method of claim 2, wherein determining the time change from the first time period to the second time period comprises:
    receiving a time signal; and
    determining when a time indicated by the time signal changes to the second time period.

5. The method of claim 1, wherein the first profile determines a first number of resources configured to process the images and the second profile determines a second number of resources configured to process the images.

6. The method of claim 5, wherein the first number of resources is more than the second number of resources.

7. The method of claim 1, wherein the encoding is a source encoding.

8. A non-transitory, computer-readable medium storing code that, when executed by at least one processing unit, causes the at least one processing unit to:
- determine a first time period associated with a time of day;
- determine a first encoding profile associated with the first time period;
- adjust resources that are configured to be used during encoding based on the first encoding profile;
- enable a pre-filtering of media data before generating an encoded bitstream based on the first encoding profile;
- disable the pre-filtering of the media data before generating the encoded bitstream based on a second encoding profile; and
- encode the media data using the adjusted resources associated with the first encoding profile, wherein (i) the adjusted resources are configured to be applied on the media data before generating the encoded bitstream, and (ii) the first encoding profile provides higher visual quality of the encoded media data than the second encoding profile.

9. The non-transitory, computer-readable medium of claim 8, wherein the code, when executed by at least one processing unit, further causes the at least one processing unit to:
- determine whether the time of day has changed to a second time period;
- based on the time of day changing to the second time period, determine the second encoding profile associated with the second time period;
- adjust the resources based on the second encoding profile; and
- encode the media data using the adjusted resources associated with the second encoding profile, wherein the adjusted resources are configured to be applied on the media before generating the encoded bitstream.

10. The non-transitory, computer-readable medium of claim 9, wherein the code, when executed by at least one processing unit, causes the at least one processing unit to:
- enable multiple encoding passes of the media data based on the first encoding profile; and
- disable multiple encoding passes of the media data based on the second encoding profile.

11. The non-transitory, computer-readable medium of claim 8, wherein the code, when executed by at least one processing unit, causes the at least one processing unit to:
- monitor the time of day; and
- determine a time period associated with the time of day.

12. An apparatus, comprising:
- an encoder configured to (i) receive a video input containing media data, (ii) enable multiple encoding passes of the media data based on a first encoding profile, (iii) disable the multiple encoding passes of the media data based on a second encoding profile, (iv) generate encoded media data in an encoded bitstream based at least in part on a current encoding profile among the first encoding profile or the second encoding profile, (v) determine the current encoding profile based on a time of day, wherein (a) the current encoding profile determines one or more resources configured to process the video input before generating the encoded bitstream and (b) the first encoding profile provides higher visual quality of the encoded media data than the second encoding profile.

13. The apparatus of claim 12, wherein the encoder is further configured to:
- enable a pre-filtering of the media data before generating the encoded bitstream based on the first encoding profile; and
- disable the pre-filtering of the media data before generating the encoded bitstream based on the second encoding profile.

14. The apparatus of claim 12, wherein the encoder is further configured to (i) determine a first time period associated with the time of day and (ii) determine the first encoding profile associated with the first time period.

15. The apparatus of claim 14, wherein the encoder is further configured to (i) monitor the time of day, (ii) determine when the time of day changes to a second time period, (iii) determine the second encoding profile associated with the second time period, and (iv) change the current encoding profile to the second encoding profile, wherein the second encoding profile causes the encoder to change a number of resources configured to process the video input before generating the encoded bitstream.

16. The apparatus of claim 12, wherein a number of resources configured to process the video input before generating the encoded bitstream is determined based on the current encoding profile.

17. The apparatus of claim 16, wherein the resources include pre-filtering, one or more encoding passes, motion range estimation, and quantization parameter determination.

18. The apparatus of claim 12, wherein (i) the encoder is further configured to enable a pre-filtering resource based on the current encoding profile to be applied before generating the encoded bitstream, and (ii) the pre-filtering resource is configured to filter noise from the video input.

19. The apparatus of claim 12, wherein the encoder is further configured to enable a quantization resource to reduce a quantization parameter based on the current encoding profile before generating the encoded bitstream.

* * * * *